United States Patent [19]

Miller

[11] Patent Number: 5,186,098
[45] Date of Patent: Feb. 16, 1993

[54] APPARATUS FOR BUTTERING AND APPLYING CHEESE TOPPING TO BREAD

[75] Inventor: Danny T. Miller, Metamora, Mich.

[73] Assignee: Little Caesar Enterprises, Inc., Detroit, Mich.

[21] Appl. No.: 666,906

[22] Filed: Mar. 11, 1991

[51] Int. Cl.$^5$ .............................................. A21C 9/04
[52] U.S. Cl. .................................. 99/494; 99/450.1; 99/516; 118/16; 118/24
[58] Field of Search ................ 99/450.1, 450.2, 450.4, 99/494, 516, 534; 118/16, 24; 222/274, 368, 486

[56] References Cited

U.S. PATENT DOCUMENTS

| | | | |
|---|---|---|---|
| 824,202 | 6/1906 | Peters. | |
| 2,119,910 | 6/1938 | Ferry | 118/24 |
| 2,300,396 | 11/1942 | Bookidis | 118/16 |
| 2,628,002 | 4/1952 | Peterson | 222/240 |
| 2,828,714 | 4/1958 | Sandberg | 118/16 |
| 3,045,640 | 7/1962 | Hill et al. | 118/16 |
| 3,358,618 | 12/1967 | Vetta | 107/1 |
| 3,379,140 | 4/1968 | Crispe et al. | 107/1 |
| 3,513,784 | 5/1970 | Kesselman | 118/24 |
| 3,611,950 | 10/1971 | Battaglia | 99/450.1 |
| 3,631,818 | 1/1969 | Zito | 99/450.7 |
| 3,645,197 | 2/1972 | McMeekin et al. | 99/450.4 |
| 3,682,106 | 8/1972 | Kuhlman | 107/1 |
| 3,757,833 | 9/1973 | Dugger et al. | 141/186 |
| 4,197,794 | 4/1980 | Raque et al. | 99/494 |
| 4,202,260 | 5/1980 | Weger | 222/368 X |
| 4,210,074 | 7/1980 | Laughman | 99/494 |
| 4,611,555 | 9/1986 | Burford | 118/684 |
| 4,685,387 | 8/1987 | Hanson et al. | 99/450.4 |
| 4,715,275 | 12/1987 | Getman | 99/494 |
| 4,715,315 | 12/1987 | Burford | 222/274 |
| 4,760,777 | 8/1988 | Welsh | 99/450.2 |

FOREIGN PATENT DOCUMENTS

| | | | |
|---|---|---|---|
| 3228614 | 2/1984 | Fed. Rep. of Germany | 99/494 |
| 6812113 | 8/1968 | Netherlands | 118/16 |
| 8900813 | 2/1989 | PCT Int'l Appl. | 99/494 |

*Primary Examiner*—Timothy F. Simone
*Attorney, Agent, or Firm*—Oblon, Spivak, McClelland, Maier & Neustadt

[57] ABSTRACT

A table-top apparatus for conveying small loaves of bread beneath a liquid applicator and a dry particle dispenser. As bread is conveyed along an upper conveyor, butter, margarine, or the like is applied by a liquid applicator. The bread then drops to a lower conveyor and is topped with grated cheese and/or seasonings from a dry particle hopper. The conveyors and the liquid applicator are run continuously. An agitator within the dry particle hopper is only run when bread moving along the lower conveyor trips a limit switch.

10 Claims, 6 Drawing Sheets

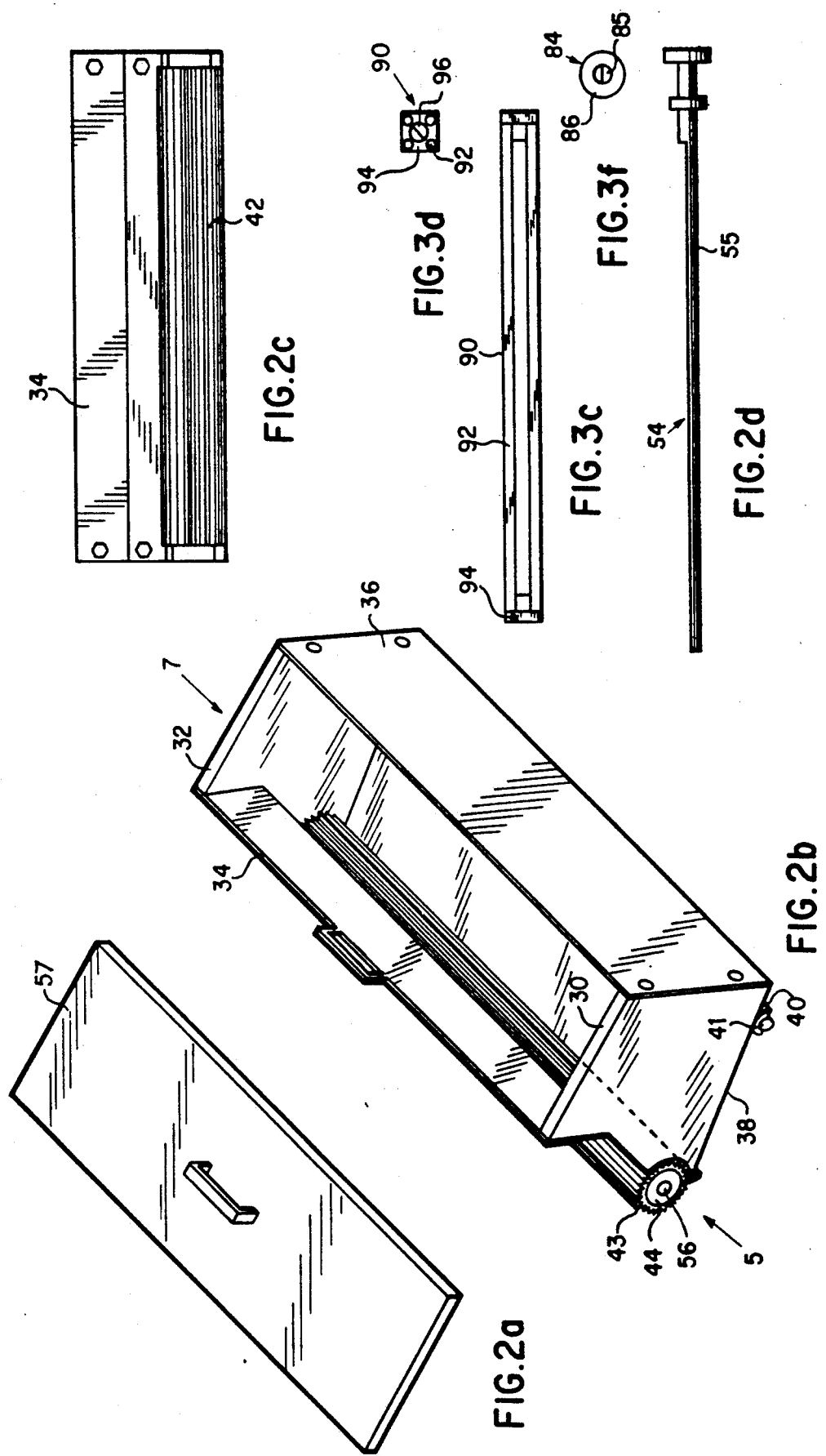

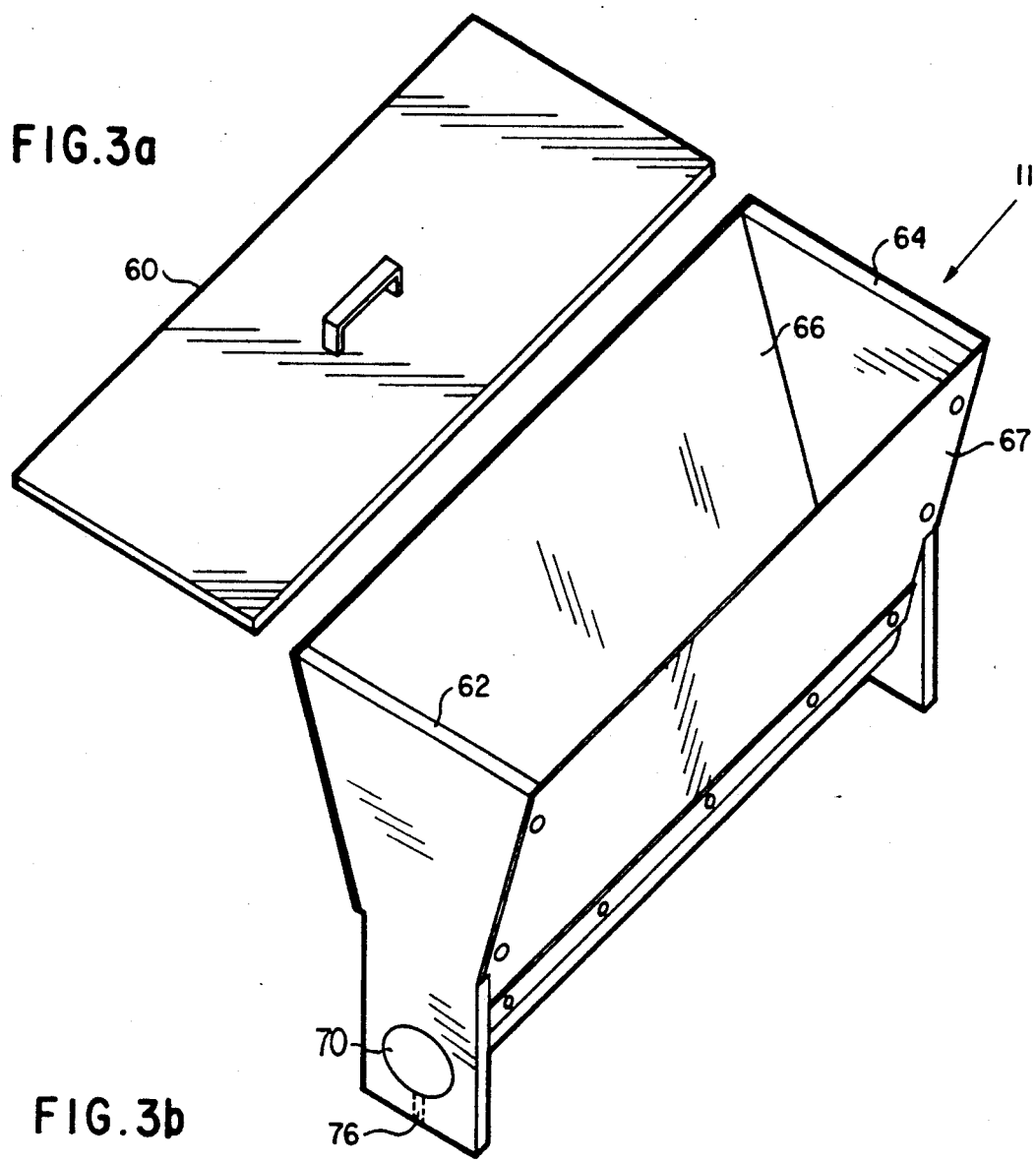
FIG.3a
FIG.3b
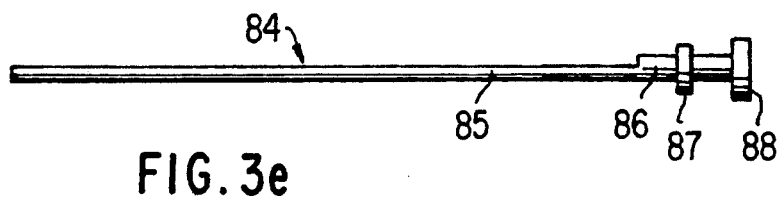
FIG.3e

APPARATUS FOR BUTTERING AND APPLYING CHEESE TOPPING TO BREAD

BACKGROUND OF THE INVENTION

1. Field of the Invention

The invention relates to food processing appliances for applying coatings and toppings to food products. More specifically, the present invention relates to a machine for automatically spreading butter and sprinkling garlic cheese topping on loaves of bread as they are carried along a table-top conveyor apparatus.

2. Background of the Related Art

Machines which dispense foodstuffs onto moving pieces of bread are known, for instance, in the sandwich-making and pizza-making arts.

U.S. Pat. No. 4,202,260 to Weger, for example, discloses a sandwich-making machine having spreadable material dispensers for mustard and mayonnaise. Additionally, the patent discloses rough material dispensers which can dispense grated cheese, chopped onions or the like onto sandwich bread. Although a device of this type could be used to apply a spreadable material and a cheese topping to slices of bread, the apparatus includes additional structure unnecessary for such a procedure. As a result, the device of Weger is economically too large, complex, and costly for such an application. In short, the use of the Weger device for such a purpose would be less efficient than using a smaller device designed exclusively for buttering bread and sprinkling a cheese topping.

U.S. Pat. No. 3,358,618 discloses a device which is capable of applying sauce, cheese and sausage to pizza dough. It automatically adjusts the amount of sauce, cheese and sausage according to the indicated size of the pizza dough. Such a device, like the Weger sandwich-making device, would be expensive and impractical to employ for applying butter (or margarine) and a cheese topping to bread.

SUMMARY OF THE INVENTION

The present invention provides a device that efficiently and quickly applies butter or margarine and a cheese product to loaves of freshly baked bread.

It is an object of the invention to provide a table-top machine capable of conveying small loaves of baked bread through the machine while dispensing butter (or margarine) and a cheese topping onto the loaves.

It is a further object of the invention to provide an apparatus which minimizes the waste of butter (or margarine) and cheese product by dispensing these food products only when they will be received by loaves of bread.

It is yet another object of the invention to provide an apparatus that is easy to take apart and clean without the use of tools.

In a preferred embodiment of the invention, the apparatus of the present invention includes a frame, a conveying means for conveying bread through the machine, and liquid and dry particle hoppers mounted on the frame above the conveying means. The liquid hopper is adjacent to and in contact with a rotatable shaft removably carrying a hollow cylindrical liquid applicator, and a removable and rotatable agitator passes through the dry particle hopper. The device further includes means for rotating the liquid applicator and the rotatable agitator, and means for driving the conveying means. As bread is carried through the machine by the conveyors, butter, margarine, or the like is deposited on the bread by the rotating applicator and a topping such as a seasoned cheese topping is deposited on the bread by the dry particle hopper.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2a is a perspective view of the lid of the liquid hopper;

FIG. 2b is a perspective view of the liquid hopper, liquid applicator, and associated supporting means;

FIG. 2c is a front view of the liquid hopper;

FIG. 2d is a cross section of the applicator drive shaft;

FIG. 3a is a perspective view of the lid for the dry particle hopper;

FIG. 3b is a perspective view of the dry particle hopper with the auger and rotatable shaft removed;

FIG. 3c is a perspective view of the agitator for the dry particle hopper;

FIG. 3d is a cross-sectional view of the agitator of FIG. 3c;

FIG. 3e is a perspective view of the rotatable shaft of the dry particle hopper;

FIG. 3f is a cross-sectional view of the shaft of FIG. 3e;

DETAILED DESCRIPTION OF THE PREFERRED EMBODIMENTS

Figure 1:
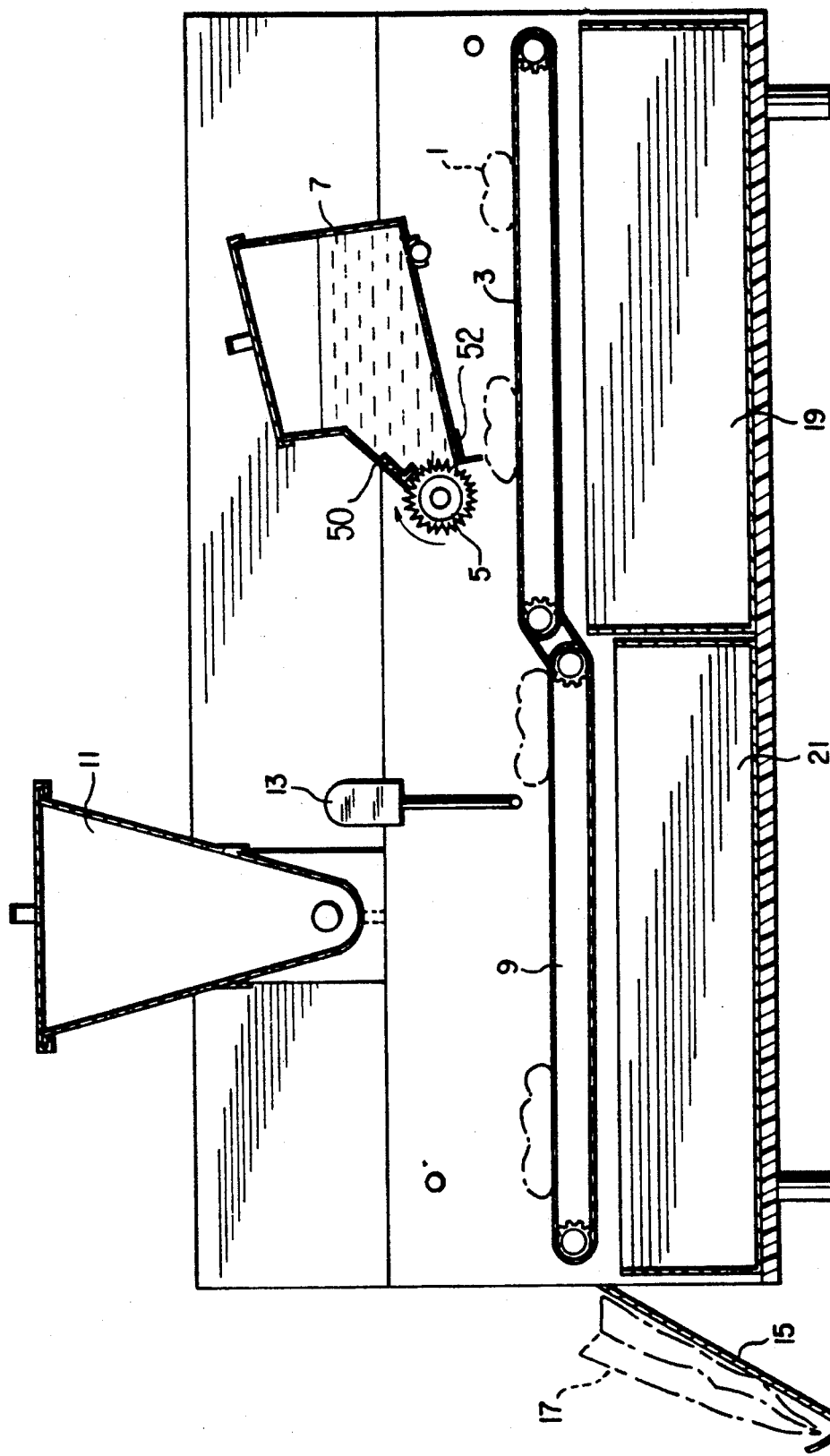
FIG. 1 is a schematic view showing the overall operation of the device from the front.

FIG. 1 schematically illustrates the sequence of operation of the present invention. Loaves of freshly baked bread or a quantity of similar food items 1 are loaded onto a moving upper conveyor 3. Upper conveyor 3 carries food items 1 past a rotating liquid applicator 5. Liquid is supplied to the applicator 5 from a liquid hopper 7, which may be filled with butter, margarine, or a similar liquid topping. The food items 1, once buttered, drop to a lower conveyor 9 which carries the food items beneath a dry particle dispenser 11. As a food item passes beneath the dry particle dispenser 11, the food items trip a switch 13, causing a particulate food topping such as garlic cheese to be applied to the food items. At the end of lower conveyor 9, a catch tray or bin is provided for receiving the coated food items. A stainless steel tray 15 carrying a paper bag 17 may be employed, for example. A butter catch tray 19 and a cheese catch tray 21, which are preferably of stainless steel, are provided beneath conveyors 3 and 9, respectively, so that clean-up can be performed efficiently.

LIQUID HOPPER STRUCTURE

FIGS. 2a–2d illustrate the liquid hopper 7 and liquid applicator 5 of the present invention. Liquid hopper 7, as shown in FIG. 2b, includes end walls 30 and 32, a front wall 34, and a rear wall 36. The material of rear wall 36 is curved or folded so that a single sheet of material forms both the rear wall 36 and a bottom 38 of the hopper. In the embodiment shown, side walls 30, 32 are of a ⅛" thick plastic such as a high density polyethylene sheet plastic readily available from many sources, including AIN Plastic Company of Michigan. Front wall 34, rear wall 36, and the bottom 38 may be of stainless steel, for example. It should also be appreciated that in an alternate embodiment, the liquid hopper could be made entirely of stainless steel or some other food grade material. Secured onto the bottom 38 of the liquid hopper are two clip retainers, one of which is indicated by reference numeral 40 in FIG. 2b. The clip retainers 40 are for securing hopper 7 to a bracing shaft 41, which is part of the supporting frame shown in FIG. 4. In the preferred embodiment of the invention, clip retainers 40 are metal, and they are welded to bottom 38. Liquid applicator 5 includes an outer sheath 42 of a pliable food grade material. In a preferred embodiment of the invention, outer sheath 42 is made from a food grade silicone material, of the type referred to under FDA #21CFR-177.2600 and NSF #V252. Such a material may be procured, for example, from a company by the name of UPCOA in Peabody, Mass. The hardness (or softness) of this material should be correlated to the hardness of the food item to be coated. In the preferred embodiment, the durometer of the material is 5 which is soft enough to avoid crushing the bread, but hard enough to retain butter in the serration spaces without collapsing. The outer sheath 42 includes a corrugated outer surface with 1/16 inch serrations which provides grooves 43 for carrying liquid to the food items 1 on the upper conveyor 3. Outer sheath 42 is secured by friction alone onto a rotatable applicator shaft 44. As can best be appreciated from FIGS. 2b and 2c, side walls 30, 32 are provided with a tight zero leak fit against rotatable applicator shaft 44. Additionally, an upper sealing member 50 and a lower sealing member 52 (see FIG. 1) are provided on front wall 34 and bottom 38, respectively, to minimize the leakage of liquid around the applicator outer sheath 42. FIG. 2d illustrates a rotatable drive shaft 54 which may be inserted into a receiving hole 56 in the center of applicator shaft 44. Drive shaft 54 includes a flat side 55 for operative engagement with applicator shaft 44 and with a drive motor, as will be discussed in further detail relative to FIG. 5. A lid 57 is illustrated in FIG. 2a.

DRY PARTICLE HOPPER STRUCTURE

FIGS. 3a–3f illustrate the dry particle hopper. It includes a lid 60, end walls 62, 64, of high density polyethylene plastic or the like, and side walls 66 and 67 of stainless steel or the like. A bore 70 is provided through each end wall 62, 64 for removably receiving an agitator 90 (FIG. 3c). End walls 62, 64 also include bores 76 which receive pins 77 and 78 (FIG. 4) to secure the hopper onto mounting frame 100. Rotatable shaft 84, shown in FIG. 3e, can be of substantially the same or identical configuration to rotatable drive shaft 54 of the liquid applicator apparatus. As shown in FIG. 3d, it includes an elongated flat-sided portion 85, a round shaft portion 86, a stop member 87, and a knurled knob 88. Shaft 84 is shown in cross section in FIG. 3f. As shown in FIG. 3c, agitator 90 includes a number of steel bars 92 connected at their ends by end pieces 94. End pieces 94 include a bore 96 which may, for example, be of the same cross section as the elongated flat-sided portion 85 of shaft 84. Alternatively, bore 96 could be a round bore provided with set screws (not shown) to secure agitator 90 to the shaft 84.

FRAME STRUCTURE

Figure 4:
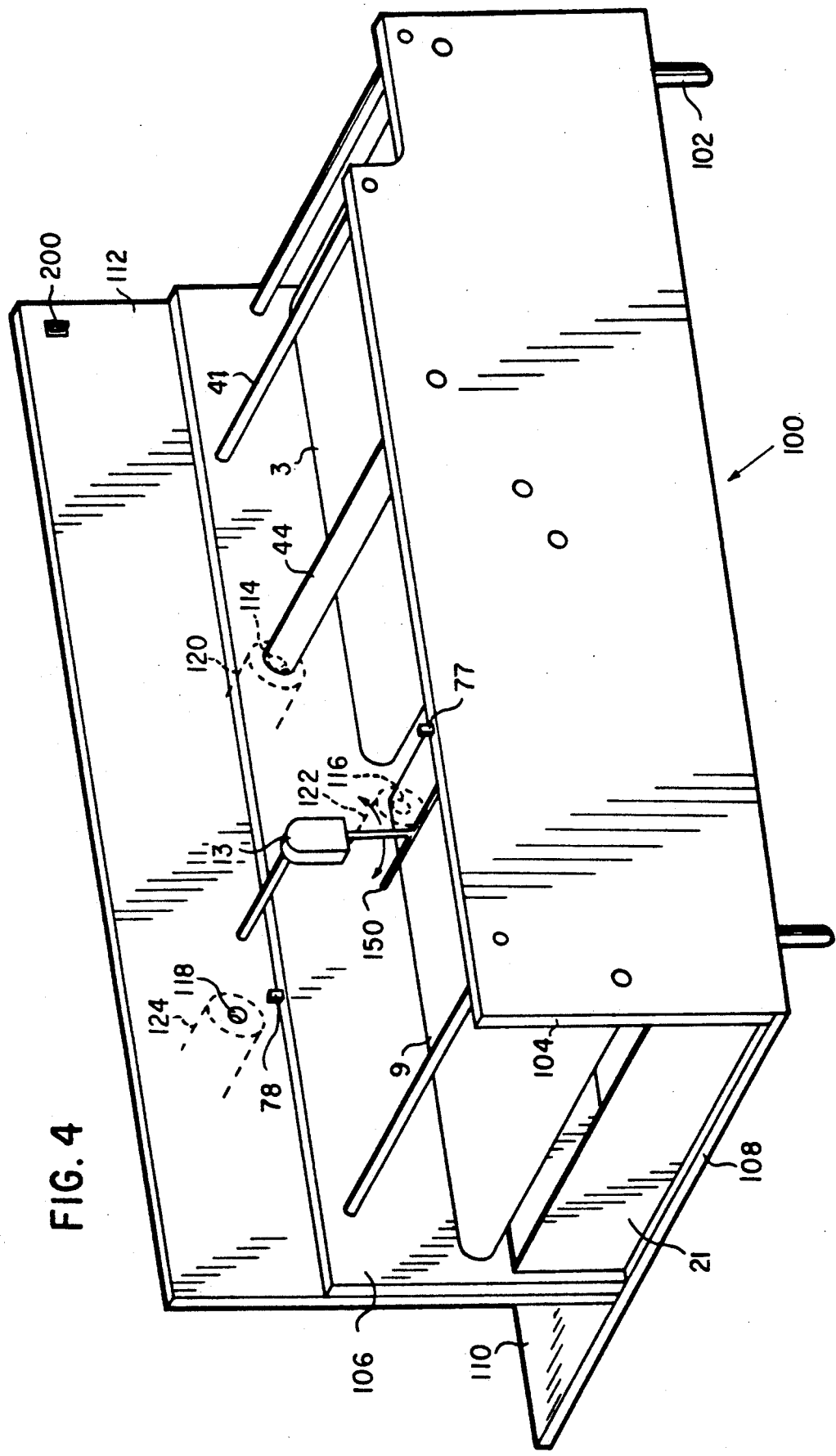
FIG. 4 is a perspective view showing the frame of the device with the dry particle and liquid hoppers removed.
Figure 5:
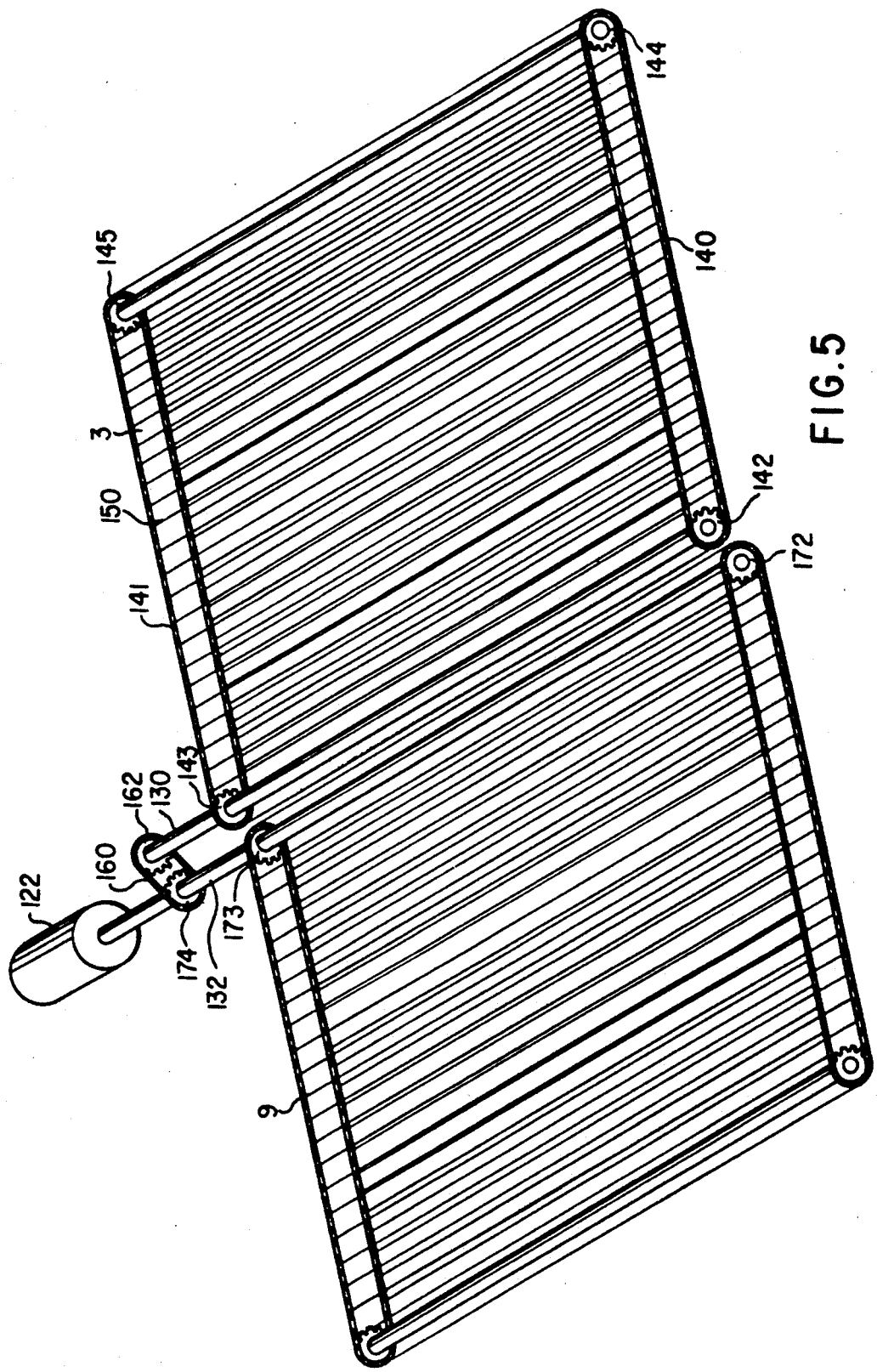
FIG. 5 is a schematic drawing showing the drive arrangement for the upper and lower conveyors.

As shown in FIG. 4, a frame 100 housing the conveyors and catch trays of the present invention is constructed of a sheet material. In the preferred embodiment of the invention, it is of ⅛" thick high density polyethylene sheet plastic. The frame is supported on a plurality of legs 102, two of which are shown. The frame includes a front vertical wall 104, a rear vertical wall 106, a base 108, and a rear platform 110. Behind the rear wall 106, another wall 112, which may, for example, be of stainless steel, is provided. A number of bores, including bores 114, 116, and 118 are provided through wall 112 for receiving shafts 54 (FIG. 2d), shaft 132 (FIG. 6), and shaft 84 (FIG. 3e), respectively. These shafts are coupled to drive means provided behind wall 112. A first motor 120 (shown in phantom), may be releasably coupled to shaft 54 to drive the liquid applicator. A second motor 122 (shown in phantom), may be releasably coupled to shaft 132 for driving the conveyors. A third motor 124 (shown in phantom), may be releasably coupled to shaft 84 to drive the cheese agitator assembly. Third motor 124 is controlled by switch 13, which is biased toward an off position. Motor 124 is engaged to rotate agitator 90 only when a passing food item 1 trips detection wire 150.

CONVEYOR DRIVE STRUCTURE

Figure 6:
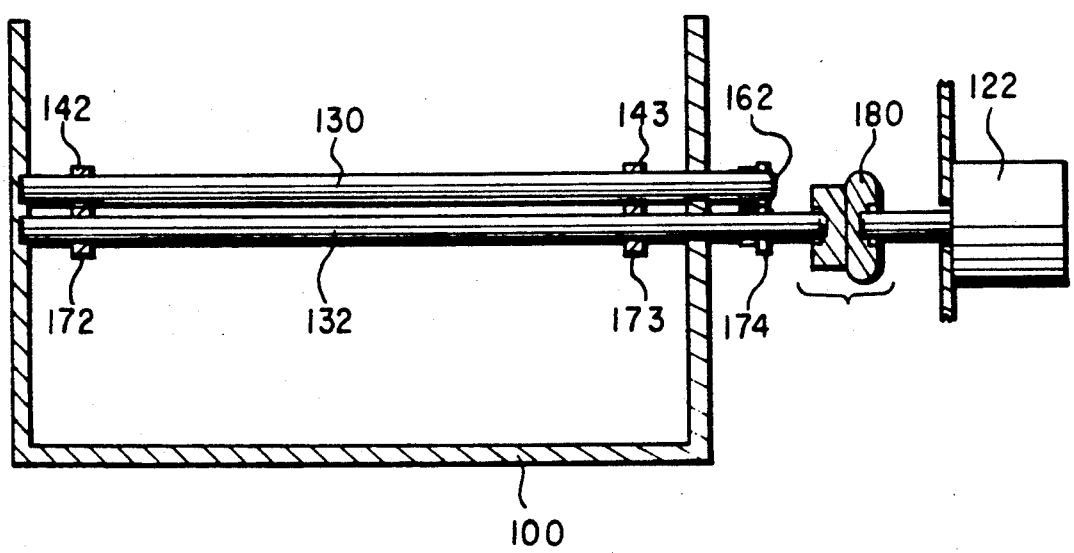
FIG. 6 is a schematic view showing the manner of connection between a drive motor of the present invention and a rotatable shaft.

FIG. 6 shows the conveyor arrangement of the present invention with rear wall 112 cut away so that the drive structure for the conveyors can be seen. Upper conveyor 3 includes a front chain 140 supported by front sprockets 142 and 144. It further includes a rear chain 141 supported by rear sprockets 143 and 145. Chains 140, 141 are fixed to a conveyor bed 150, which may, for example, be a wire grill arrangement which is wired to the chains. A wire grill or large mesh screen is preferable for conveyor bed 150 so that food particles fall freely into catch trays 19 and 21 (FIG. 1). Upper conveyor 3 is driven by sprockets 142 and 143, which are secured to shaft 130. Shaft 130, in turn, is rotated by a drive chain 160 operatively engaged with a drive sprocket 162. Shaft 132, which carries drive sprockets 172, 173, and 174, is inserted into a coupling 180 (See FIG. 6) so as to be driven directly by motor 122. Motor 122 may be a variable speed motor to permit the speed of the conveyor belts to be varied. Alternatively, an electronic speed control may be employed to vary the conveyor belt speed.

A coupling like coupling 180 can be used to couple shaft 54 of the buttering apparatus to its respective drive motor 120. Similarly, such a coupling can also be used to couple shaft 84 to its respective drive motor 124.

OPERATING PROCEDURE OF THE APPARATUS

In order to operate the device, one would first insure that hoppers 7 and 11 are properly secured to frame 100 by their respective mounting structures. Liquid hopper 7 would then be filled with melted butter, liquid margarine, or the like. A cheese seasoning or other desired particulate topping would then be placed in hopper 11 and a bag 17 or similar container would be put in place on the exit tray 15. A switch 200 (see FIG. 4) would then be turned on to activate motors 120 and 122, which run continuously while switch 200 is on. The cheese applicator motor 124, however, remains in a stand-by mode until it is activated by the limit switch 13. Freshly baked bread is then placed on upper conveyor 3, and it is conveyed to the butter applicator 5. It should be appreciated that the seals 50 and 52 of liquid hopper 7 prevent excessive amounts of butter from leaking from the hopper until applicator roller 42 comes into contact with a food item. After the bread is buttered by the applicator roller, it drops to the lower (cheese) conveyor 9, which carries the bread into contact with trip wire 150. Trip wire 150 trips switch 13, which causes motor 124 to rotate agitator 90 to sift the cheese topping onto the bread through a number of holes (not shown) located in the base of cheese hopper 11. While it is shown in FIG. 1 that the agitator 90 is rotated in a clockwise direction, it should be appreciated that it could be rotated in either direction. It could also be geared like a washing machine agitator so as to rotate in alternating directions. Once cheese is deposited on the bread, wire 150 is released, causing motor 124 to return to its stand-by mode. The bread is then dropped into the awaiting receiving bag 17.

The apparatus of the present invention may also be adapted to operate in conjunction with other food processing appliances. For example, this apparatus could be positioned downstream from an automatic toasting machine so that it applies butter to toast or the like. It would, of course, be necessary to synchronize the speed and horizontal plane of the conveyor means and provide conventional mounting brackets to attach the machines.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A machine for buttering and applying a cheese topping to bread, comprising:
   a frame;
   a conveying means for conveying bread through the machine;
   a liquid hopper removably mounted on said frame and having a mouth located a set distance above said conveying means;
   a rotatable shaft adjacent to said liquid hopper, said rotatable shaft removably carrying a hollow cylindrical liquid applicator thereon, said applicator being adjacent to and in contact with said mount to form a seal;
   a dry particle hopper removably mounted on said frame and having a base portion located above said conveying means;
   a removable and rotatable agitator passing through the base portion;
   means for continuously powering said conveying means to convey bread through said machine;
   means for rotating said rotatable shaft and said applicator irrespective of the location of the bread in said machine, said applicator being adapted to retain said liquid until said applicator comes into contact with said bread, and said applicator being adapted to apply said liquid to said bread without crushing said bread; and
   means for rotating said rotatable agitator to apply dry particles from said dry particle hopper to said bread.

2. The machine according to claim 1, wherein said conveying means includes an upper conveyor and a lower conveyor.

3. The machine according to claim 2, wherein a single motor drives both said upper conveyor and said lower conveyor.

4. The machine according to claim 2, wherein a chain transfers rotational motion between a sprocket on said upper conveyor and a sprocket on said lower conveyor.

5. The machine according to claim 1, wherein said applicator has a corrugated outer surface.

6. The machine according to claim 1, wherein said applicator is made of a food grade silicone.

7. The machine according to claim 1, wherein said liquid hopper includes at least one flexible seal in contact with said applicator to minimize leakage.

8. The machine according to claim 1, wherein said means for rotating said rotatable agitator comprises a motor controlled by a trip switch.

9. The machine according to claim 8, wherein said trip switch includes a wire which is mounted so as to be tripped by bread moving along said conveying means.

10. A machine for applying toppings to a food product, comprising:
    a frame;
    an upper conveyor and a lower conveyor for conveying the food product through the machine;
    a liquid hopper removably mounted on said frame and having a mouth located a set distance above the upper conveyor;
    a rotatable shaft adjacent to said liquid hopper, said rotatable shaft removably carrying a hollow cylindrical liquid applicator thereon, said applicator being adjacent to and in contact with said mouth;
    a dry particle hopper removably mounted on said frame above said lower conveyor;
    a removable and rotatable agitator passing through said dry particle hopper;
    means for rotating said rotatable shaft and said rotatable agitator; and
    a single motor driving both said upper conveyor and said lower conveyor.

* * * * *